Patented Sept. 24, 1940

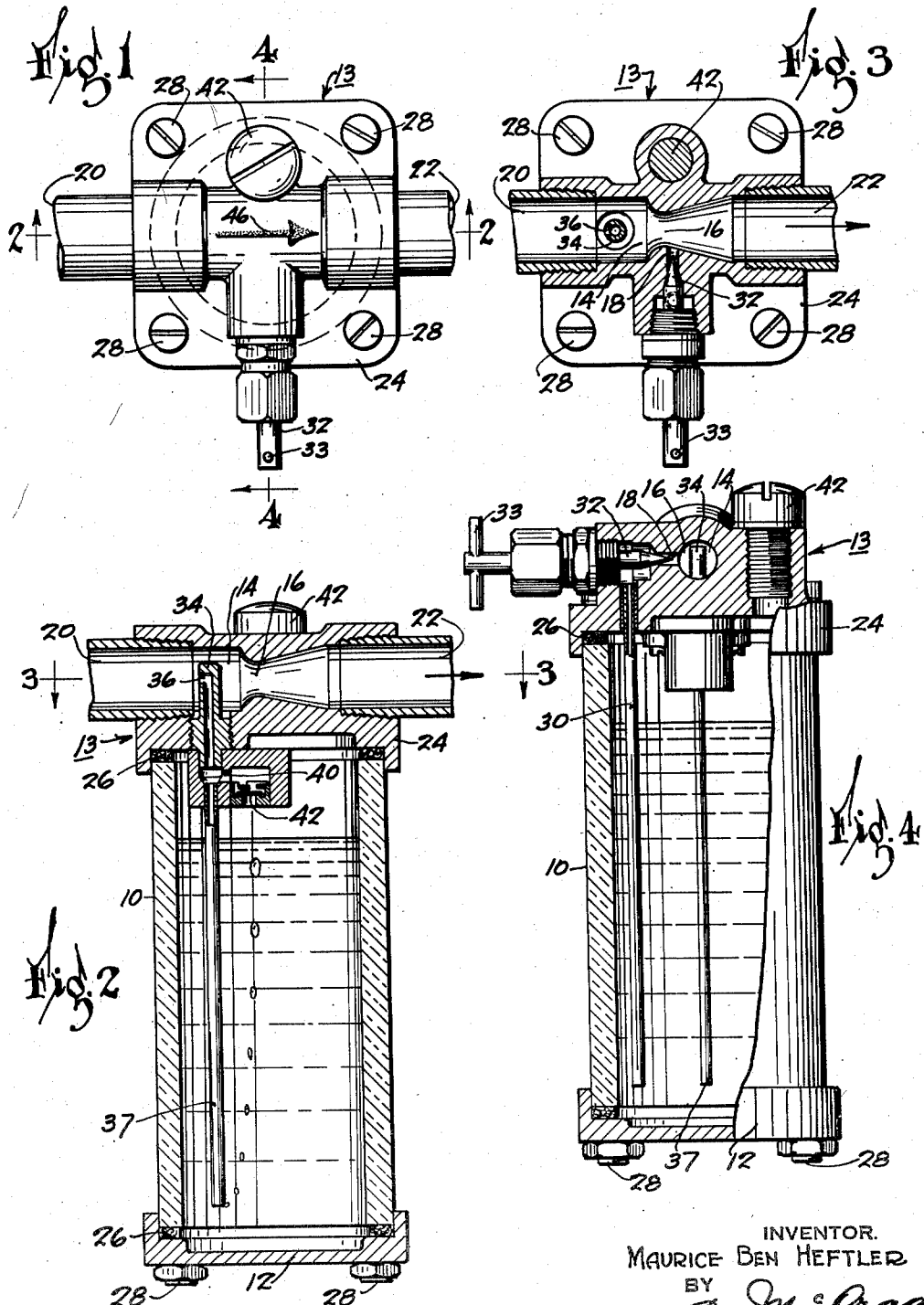

2,215,699

UNITED STATES PATENT OFFICE 2,215,699

LUBRICATOR

Maurice Ben Heftler, Detroit, Mich., assignor to Zenith Carburetor Company, Detroit, Mich., a corporation of Michigan Application March 18, 1937, Serial No. 131,594

7 Claims. (Cl. 184—55)

This invention relates to lubricating apparatus, and is particularly designed for the lubrication of devices such as pneumatic hammers, which are driven by compressed air. Due to the conditions of operation and the construction of such devices, it is advantageous to lubricate them by adding to the compressed air or other motive fluid supplied thereto a continuous stream of lubricant in the form of a spray which is atomized into the motive fluid so as to carburet the same.

The present invention provides means for accomplishing this purpose, by utilizing a pressure differential existing at spaced points in the compressed air passage, and by utilizing the energy of the flowing air to atomize the lubricant so as to maintain it in suspended condition until it is deposited upon the moving parts of the pneumatic hammer or other device.

An object of the invention is to provide a device of the character above outlined, which is of simplified and improved construction, and superior in operation to the known devices.

Further objects and advantages of the invention will be apparent from the following description, taken in connection with the appended drawing, in which:

Figure 1 is a plan view of a device embodying the invention;

Figure 2 is a vertical section on the line 2—2 on Figure 1;

Figure 3 is a longitudinal section taken on the line 3—3 of Figure 2; and

Figure 4 is a vertical section taken on the line 4—4 of Figure 1.

Referring more particularly to the drawing, the device is seen to comprise a reservoir for liquid lubricant, formed chiefly by a glass cylinder 10 provided with a base 12 and having a head 13 mounted thereon. A passage 14 for compressed air to be carbureted extends transversely of the head and is provided with a Venturi throat 16 into which discharges a lubricant orifice or jet 18. The compressed air enters from a pump or other source of pressure through an inlet 20, and leaves through an outlet 22 to pass to the device to be driven thereby. The base 24 of the head forms a cover for the reservoir 10, suitable gaskets 26 being provided to prevent leakage.

The head, cylinder 10, and base 12 are secured together by means of vertical bolts 28. A filler plug 42 is provided in the head, as shown.

A conduit 30 for lubricant leads from a point near the bottom of reservoir 10 to the jet 18, an adjustable valve member 32 being provided to control the rate of feed of the lubricant. Valve 32 is provided with the usual sealing glands, and is actuated by means of a cross pin 33. Anterior to the Venturi throat 16, a Pitot tube 34 projects into the passage 14, with its orifice 36 facing the stream of inflowing air. Tube 34 communicates with a pressure conduit 37 which extends to a point adjacent the bottom of reservoir 10, so as to transmit to the reservoir 10 a pressure which varies with the pressure in passage 14 and with the velocity of flow therein, and thus force the lubricant to flow upwardly through conduit 30 at a rate approximately proportionate to the velocity of flow of compressed air.

In order to prevent the compressed air above the lubricant level in reservoir 10 from forcing a large amount of lubricant out of the reservoir when the pressure in passage 14 is suddenly shut off, a bypass conduit 40 connects tube 34 with reservoir 10 above the lubricant level thereof, and is provided with a gravity-seated check valve 42, which remains closed during the normal operation of the device, but upon sudden release of the pressure in passage 14 is moved off from its seat by the compressed air in the reservoir to allow the same to discharge through the bypass and out through opening 36.

In the operation of the device, the reservoir is filled with lubricant to a point below the level of check valve 42. If pressure is then applied to the line the device does not function until the air-driven tool is put into operation, and then only in proportion to the velocity of flow through the passage 14. As such velocity increases, the impact effect at opening 36 increases so as to increase the pressure upon the liquid in the reservoir while at the same time the depression created by the venturi 16 is also augmented, so that the discharge of fuel through jet 18, which is a function of the differential of the pressures at 36 and at 16, will increase proportionately. Due to the high velocity of the air at throat 16, the lubricant, even though it may be of relatively high viscosity, will be atomized and carried along by the stream of air in a suspended condition, to be deposited upon the valves and bearings of the tool to lubricate the same.

The rate of discharge of lubricant through jet 18 will be proportional to the flow of air through conduit 36, and since such air passes upwardly through the body of lubricant in the form of visible bubbles, the operator can at any time ascertain the rate of discharge of the lubricant by viewing the bubbles through the transparent cylinder 10. This enables him to ascertain at any time whether the device is operating or not and, if operating, at what rate.

In order to avoid the possibility of the device being connected into the pressure line in the wrong direction, arrow 46 may be formed on the head 12, pointing in the direction of air flow.

Although the invention has been described with special reference to a particular embodiment thereof, it is not limited to the form disclosed, but may be considerably modified within the language of the following claims.

I claim:

1. In lubricating apparatus of the class described, a passage for air under pressure, a lubricant reservoir associated therewith, means for transmitting the pressure in said passage to said reservoir to maintain the same under pressure, a check valve operative upon release of pressure in said passage to relieve the pressure in said reservoir, and a conduit for conducting lubricant from said reservoir to said passage.

2. A lubricator comprising a passage for compressed air, a liquid reservoir positioned below the passage and having a transparent wall, a Pitot tube transmitting air under velocity pressure from said passage to a point in said reservoir adjacent the bottom thereof, a check valve operative upon release of pressure in said passage to relieve the pressure in said reservoir, a liquid discharge jet in said passage, and a conduit for conveying the liquid from said reservoir to said jet.

3. A lubricator for compressed air actuated devices comprising, a passage for compressed air, a lubricant reservoir associated therewith, a lubricant passage leading from the reservoir to a point of relatively low pressure in the conduit, an air passage leading from a point of relatively high pressure in the conduit to a point below the lubricant level in the reservoir, and a check valve operative in one position to relieve the pressure in the reservoir.

4. In a lubricating device having an air passage and a lubricant reservoir connected to and associated therewith, a conduit leading from the reservoir adjacent the bottom thereof to the air passage for transmitting liquid lubricant thereto, and an automatic valve to connect the reservoir to the air passage when the pressure in the reservoir exceeds the pressure in the passage.

5. In a lubricating device for compressed air utilizing devices, a passage for compressed air including a venturi, a lubricant reservoir associated therewith, a lubricant discharge conduit leading from the reservoir to the venturi, a compressed air conduit leading from said passage to said reservoir, a bypass for said compressed air conduit, and means normally obstructing said bypass but moved to a non-obstructing position when the pressure in the reservoir exceeds the pressure in the passage.

6. A lubricator comprising a passage for compressed air, flow accelerating means in said passage for creating a region of relatively low pressure, a lubricant reservoir, a conduit communicating the reservoir adjacent the bottom thereof with the passage in the region of said low pressure, a second conduit connecting said reservoir and the passage, adjustable means for varying the cross-sectional area of one of the conduits, and check valve means operable in one position to relieve the pressure in said reservoir.

7. In a lubricator for compressed air actuated devices having a passage for compressed air and a lubricant reservoir connected to and associated therewith, means for transmitting pressure from the passage to the reservoir, and an automatic valve to relieve the pressure in the reservoir when the pressure in the reservoir exceeds the pressure in the passage.

MAURICE BEN HEFTLER.